(12) United States Patent
Breault

(10) Patent No.: US 6,343,721 B1
(45) Date of Patent: Feb. 5, 2002

(54) SEALED DISPENSING DEVICE

(75) Inventor: John P. Breault, New Britain, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/568,577

(22) Filed: May 11, 2000

Related U.S. Application Data

(60) Provisional application No. 60/135,959, filed on May 26, 1999.

(51) Int. Cl.[7] ............................................. B65D 83/00
(52) U.S. Cl. ...................................... 222/399; 222/504
(58) Field of Search .............................. 222/399, 504, 222/509, 518, 559

(56) References Cited

U.S. PATENT DOCUMENTS

| | | | | |
|---|---|---|---|---|
| 4,711,379 A | * | 12/1987 | Price | 222/504 |
| 5,178,304 A | * | 1/1993 | Toterotot | 222/504 |
| 5,462,199 A | * | 10/1995 | Lenhardt | 222/504 |
| 5,535,919 A | * | 7/1996 | Ganzer et al. | 222/504 |

* cited by examiner

Primary Examiner—Joseph Kaufman
(74) Attorney, Agent, or Firm—Steven C. Bauman

(57) ABSTRACT

A dispensing device provides for dispensing of flowable material such as adhesives. The dispensing device includes a housing having a chamber with an inlet port and an outlet port for receiving and dispensing the flowable material. A valve assembly is supported within the housing having a moveable valve stem for opening and closing the outlet port. A flexible sleeve circumferentially surrounds a portion of the valve stem for isolating the flowable material from the moveable valve stem.

13 Claims, 5 Drawing Sheets

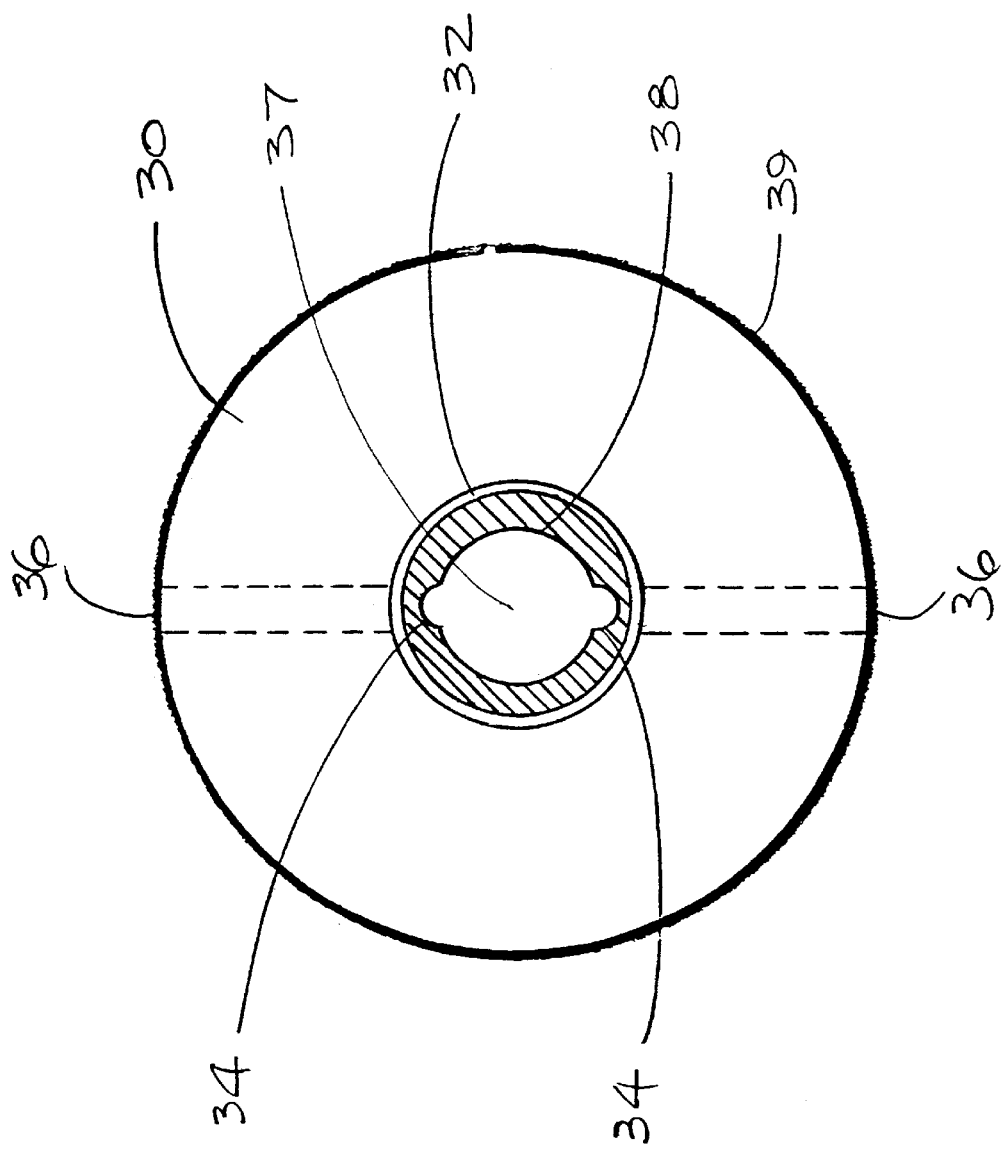

SEALED DISPENSING DEVICE

This appln claims benefit of Prov. No. 60/135,959 filed May 26, 1999.

FIELD OF THE INVENTION

This invention relates to a device for dispensing metered amounts of flowable materials. More specifically, this invention relates to a device for dispensing liquid adhesive materials that includes a sealing arrangement providing for continuous operation over extended periods of time.

BACKGROUND OF THE INVENTION

Adhesives are used extensively in many industries, such as automotive, medical and electronics industry. Adhesives provide an efficient means of joining together two or more components. In many industrial applications, dispensing devices are typically employed to automatically apply adhesives to products that are being fabricated in a continuous manufacturing process. In certain applications, the adhesives are applied to small objects and in small amounts of only a few drops. If an insufficient amount of adhesive is applied, the two components will not properly bond together. If too much adhesive is applied, the excess adhesive can interfere with the operation of the product or form unwanted bonds with other components. In either case, the incorrect application of adhesive may render the component defective and, therefore, unsuitable for sale.

Dispensing devices in modern industrial processes for effective and efficient operation operate without failure over thousands of cycles of operation. Thus, the dispensing device reliably applies a precise amount of adhesive and operates continuously for long periods of time with a minimum amount of down time for maintenance and repair.

Many of the adhesive dispensing devices used in automated manufacturing processes are mounted on robotic arms. If the dispensing device is too large, it can restrict the movement of the robotic arm and complicate the manufacturing process. As a consequence, adhesive dispensing devices of relatively small size are desirable. However, decreasing the size of the dispensing device creates problems because the smaller chambers and passages of these devices are more likely to become obstructed.

One of the most common problems encountered with adhesive dispensing devices is clogging caused by premature curing of the adhesive before it has been dispensed. This premature curing is often the result of a breach of the sealed vessel that contains the adhesive.

Adhesives often begin to cure when exposed to air or to a material, such as certain metals, that acts as an accelerant. The high performance adhesives used in many manufacturing processes can be especially difficult to handle, because they are usually fast curing, requiring a very brief exposure to air or a curing agent before they harden. As a consequence, these adhesives often begin to cure while still in the dispensing device. Even very small amounts of cured adhesive in the dispensing device can interfere with the operation of the dispenser and require that it be taken out of service.

Many dispensing devices use a valve stem passing through a chamber containing the adhesive to control the outlet flow. The seals that isolate the material inside the device from being contacted by the air on the outside are important components of each device. Known dispensing devices have experienced problems with these seals for a variety of reasons. One of the reasons is the demanding operating conditions. Most dispensing devices used in industrial processes operate at high pressures to insure that the adhesive can be delivered in exact amounts in a short period of time. The long and narrow capillaries in which the adhesives are transported, together with the viscous nature of the adhesives, use operating pressures that can reach or exceed 600 psi in order to assure reliable operation. These elevated pressures shorten the life of the seals. After the seals begin to wear, the high operating pressure causes the adhesive to leak out of the dispenser. Once the adhesive leaks out, it cures and interferes with the operation of the dispenser. The manufacturing process then has to be stopped while the dispensing device is either repaired or replaced. These interruptions are disruptive and expensive for the manufacturer because they effect production and increase maintenance coats.

Dispensing devices with valve type nozzles have also been widely used for dispensing adhesives and other flowable materials. The conventional valve design in such devices has a chamber containing the material that is being dispensed, an outlet nozzle through which the material is dispensed and a needle that opens and closes to regulate the flow of the material. The valve needle is attached to the valve stem which extends through the valve body and connects to an actuating device, which moves the valve stem to open and close the valve. One of the major problems with this design is the leaking of the material at the point where the valve stem passes through the valve body. Conventionally, different types of O-ring seals are used to prevent leakage. While O-ring seals are acceptable for some applications, they have been found to prematurely leak when used in high pressure applications or when corrosive materials are used.

Adhesive materials which can begin to cure while still in the dispensing device present one of the most difficult applications for dispensing devices. The adhesive materials tend to adhere to the valve stem and harden. The hardened adhesive material on the stem will begin to abrade the valve seal over time as the stem moves back and forth through the seal to open and close the valve. In a typical manufacturing operation, the valve may cycle open and closed hundreds of times an hour. Eventually, the abrasion from the hardened adhesive on the valve stem causes the seal to leak and the dispensing device has to be repaired or replaced. In high pressure applications, this problem is exacerbated by the high pressures which place greater stress on the seals and cause the materials to leak more quickly.

The increased maintenance costs and the lost production time required for repair or replacement of inoperable dispensing devices, have created a need for a more dependable dispensing device.

SUMMARY OF THE INVENTION

The present invention, therefore, provides a dispensing device for dispensing flowable materials, such as adhesives. The dispensing device includes a housing having a chamber and an inlet port and an outlet port for receiving and dispensing a flowable material. A valve assembly is supported within the housing having a moveable valve stem for opening and closing the outlet port. A flexible sleeve is circumferentially disposed in surrounding relationship about a section of the valve stem and spaced apart from the valve stem for isolating the flowable material from a section of the valve stem.

In a preferred embodiment, the flexible sleeve includes a compressible section in the form of a bellows. The flexible sleeve defines a space about the valve stem. The dispensing device includes means for introducing a liquid into this space. Means is also provided for controlling the pressure of the liquid to compensate for pressure perturbations resulting from the opening and closing of the valve.

The sleeve can be made from a variety of materials, including polytetrafluoroethylene (PTFE), nylon, polyethylene, polypropylene and combinations thereof. The most preferred material is PTFE, which has been found to be chemically resistant to a variety of adhesive materials while providing the durability and strength needed for continuous operation over extended periods of time. In addition to being durable, the material used for the sleeve must also be flexible so that it will be able to change its shape as the liquid is withdrawn and then reintroduced when the valve opens and closes.

The dispensing device includes actuating means for moving the valve stem to open and close the valve and sealing means disposed between the valve chamber and the actuating means. The sealing means prevents the material in the valve chamber from leaking out at the point where the valve stem passes through the valve body. The sealing means can include a seal having a tapered nozzle. The sleeve is disposed around the nozzle and the seal is disposed between the flowable material and the actuating means. In another embodiment, the seal also includes means for introducing a liquid between the sleeve and the stem.

The present invention provides a number of advantages over dispensing devices used in the prior art, including longer life and more efficient operation. This design isolates the surface of the seal that contacts the valve stem from the material in the valve chamber and insures that the valve stem can pass through the seal without experiencing clogging problems common in prior art devices. By isolating the valve stem from the seal, the present invention avoids the problems caused by adhesives hardening on the valve stem and, thereby, increases the life of the seal. The section of the valve stem that passes through the valve body is surrounded by a liquid so that the material in the valve chamber does not contact the valve stem at the point where it passes through the seal. This minimizes the wear on the seal and allows the valve to cycle on and off for greater periods of time before requiring maintenance or replacement. Isolating the valve stem from the seal also minimizes clogging and provides more reliable operation. As a result, the dispensing device can be continuously operated for longer periods of time than prior art devices and, thereby, provides increased production at reduced costs.

BRIEF DESCRIPTION OF THE DRAWINGS

The dispensing device of the present invention will become readily apparent after reading the following description of the accompanying drawings in which:

FIG. 5 is an end view of the seal ring of the preferred embodiment of the present invention.

DETAILED DESCRIPTION OF THE INVENTION

The dispensing device of the present invention overcomes the problems of devices discussed above by providing a reliable seal that prevents the flowable material in the valve chamber from leaking.

The present invention replaces O-ring type, compression packing and molded packing seals commonly used in prior art devices with a sleeve that surrounds a section of the valve stem and isolates the portion of the seal in contact with the valve stem from the material in the valve chamber. This arrangement solves the problem of material build-up on the stem wearing down of the seal. The sleeve and seal ring combination allows the dispensing device of the present invention to be used for a variety of different materials over a wide range of pressures and with longer periods between shutdowns for maintenance and/or replacement.

Figure 1:
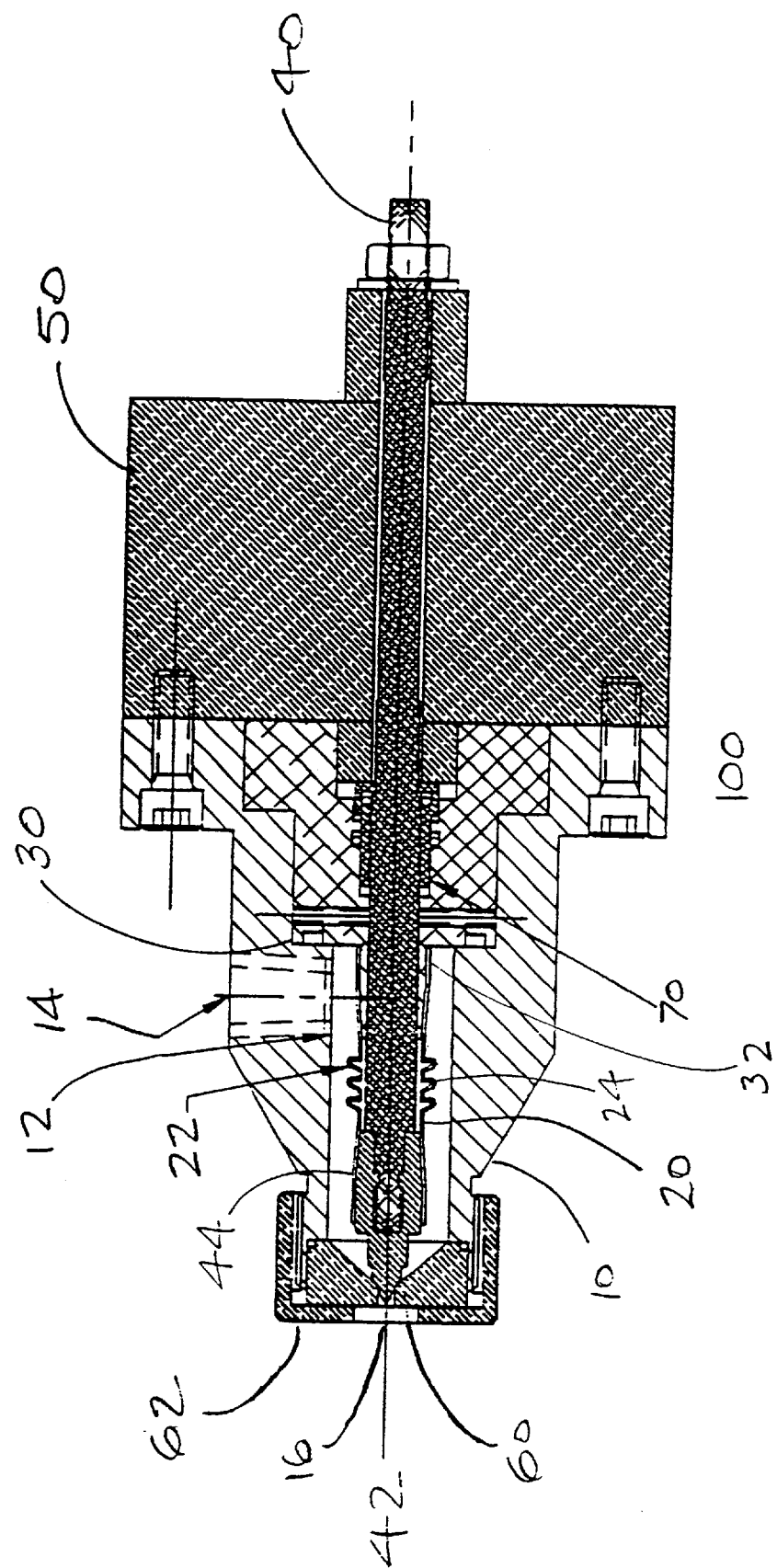
FIG. 1 is a longitudinal sectional view of the dispensing device of the present invention.
Figure 2:
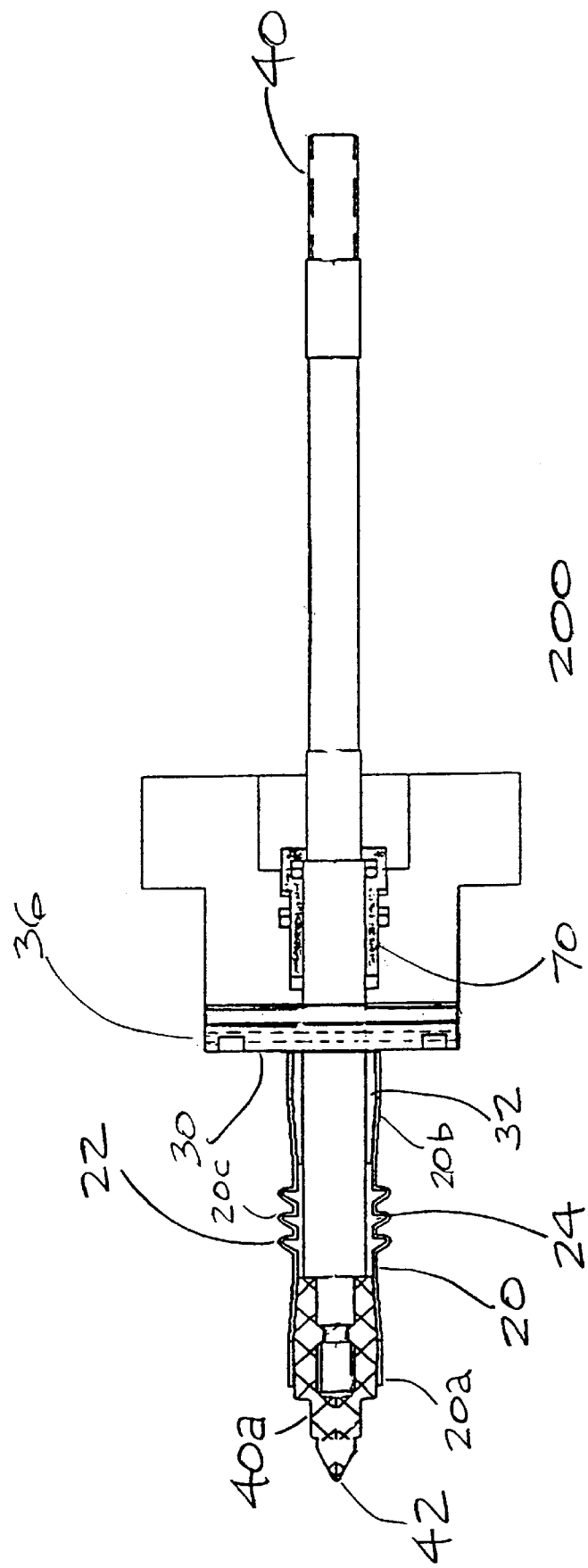
FIG. 2 is a side view of a valve stem assembly and a sleeve of the dispensing device shown in FIG. 1.

Referring to FIGS. 1 and 2, a preferred embodiment of the dispensing device 100 of the present invention is shown. FIG. 1 shows a dispensing device 100 which includes a valve body 10, an actuator 50 and a valve stem assembly 200. FIG. 2 shows the valve stem assembly 200 in further detail.

Dispensing device 100 includes a valve body 10 defining a chamber 12 for accommodating a flowable material, such as an adhesive. Valve body 10 includes an inlet port 14 and an outlet port 16 in communication with chamber 12 for receiving and dispensing the adhesive. A valve seat 60 is supported by the valve body 10 about the outlet port 16 by an end cap 62. Valve body 10 supports an elongate valve stem 40 which is reciprocally movable within and through chamber 12 under the actuation of the actuator 50. A valve needle 42 is supported at one end 40a of valve stem 40. Valve needle 42 is movable upon the reciprocating movement of valve stem 40 into seated engagement with valve seat 60 to sealably open and close outlet port 16 to permit the metered dispensing of adhesive contained within chamber 12. While valve needle 42 is shown attached to end 40a of the valve stem 40, it can alternatively be formed integral therewith.

Valve body 10 further supports an elongate flexible tubular sleeve 20 within chamber 12. As shown in further detail in FIG. 4, the first end 20a of the flexible sleeve 20 is positioned over an intermediate section 40b of the valve stem 40 which passes through the valve chamber 12. It is contemplated that the sleeve 20 is installed by sliding it onto the stem 40 from the end adjacent actuator 50 towards the needle valve 42. The needle valve 42 includes a tapered section 44 so that a first end 20a of the sleeve 20 extends over and fits tightly therearound. After the sleeve 20 is positioned tightly over the tapered section 44, a seal ring 30 having a tapered nozzle 32 on the side facing the sleeve 20 is slipped onto the valve stem 40. A second end 20b of the sleeve 20 extends over and fits tightly therearound the tapered nozzle 32 establishing a tight seal between the sleeve 20 and the tapered nozzle 32. When the dispensing device 100 is assembled, the sleeve 20 is compressively held in place between the tapered section 44 of the valve stem 40 and the tapered nozzle 32. When the valve 10 is in operation, the pressure of the adhesive in the chamber 12 compresses the first end 20a of the sleeve 20 around the stem 40 and the second end 20b of the sleeve 20 around the tapered nozzle 32 to form a tight seal on each end of the sleeve 20. Because the section of the valve stem 40 that passes in and out of the valve chamber 12 is isolated from the adhesive by the sleeve 20, the adhesive cannot build up on the valve stem 40 and damage the seal ring 30. It is further contemplated that with use of an adhesive, any adhesive build-up at the open ends of the sleeve 20 assists in sealing the ends of the sleeve 20.

Figure 3:
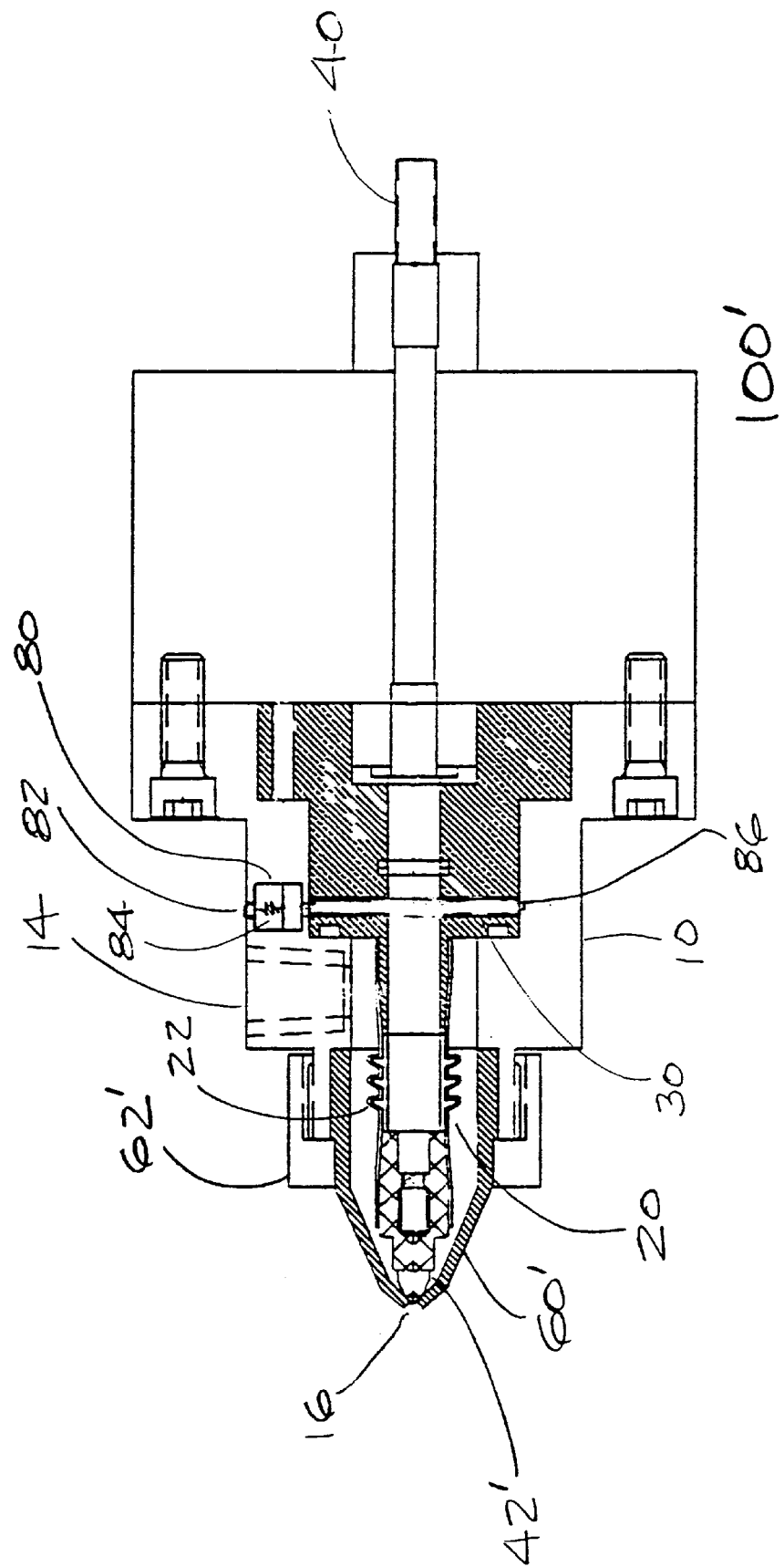
FIG. 3 is a side view, partially in section, of a further embodiment of the dispensing device of the present invention.
Figure 4:
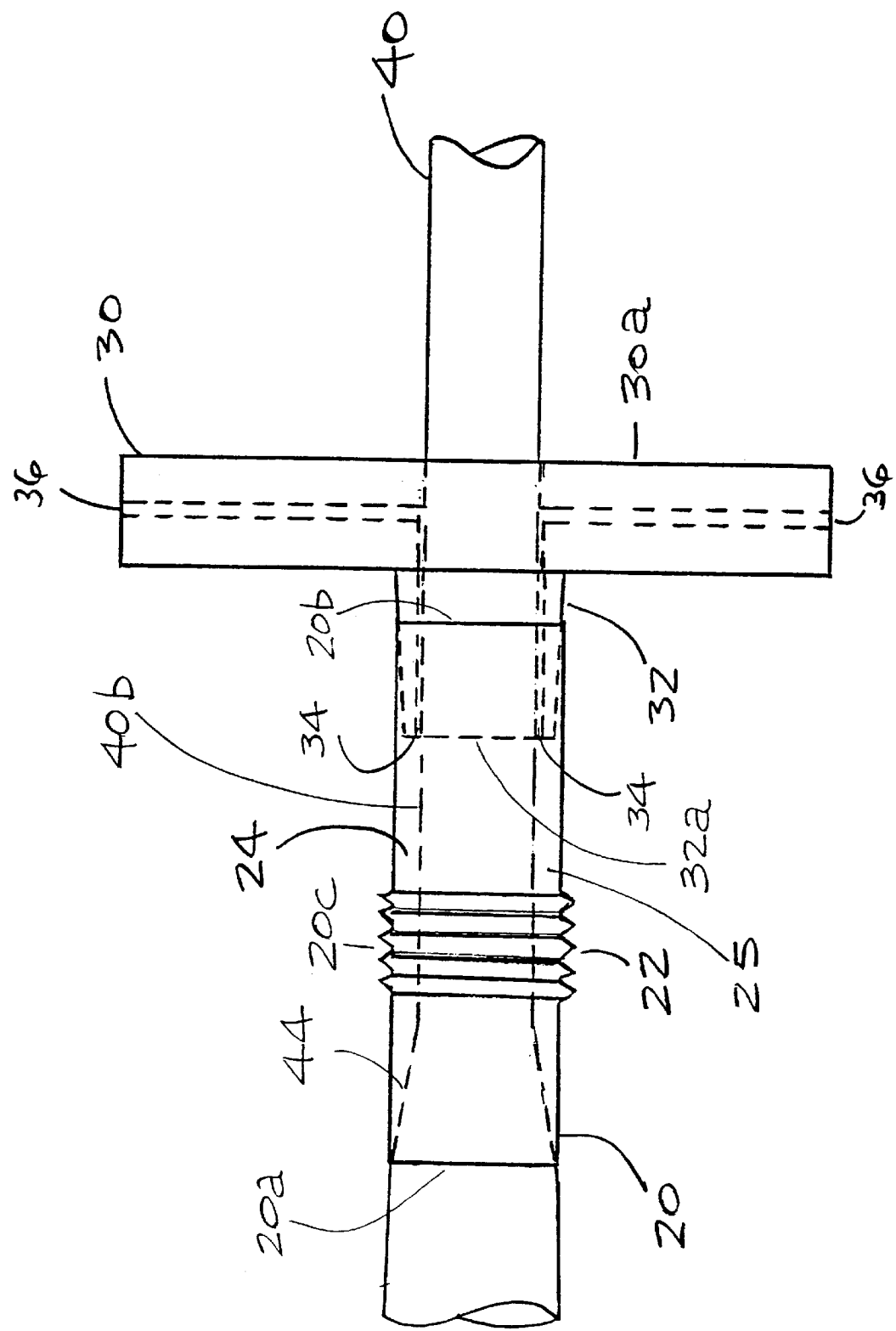
FIG. 4 is a side view of the sleeve and a seal ring assembly of the preferred embodiment of the present invention.

With additional reference to FIGS. 4 and 5, tubular sleeve 20 includes a middle portion 20c which forms a bellows 22 that provides the sleeve 20 with additional longitudinal flexibility. Sleeve 20 defines an annular region 24 formed between the sleeve 20 and the valve stem 40 which is filled with a liquid 25. Various liquids suitable for use are well known in the art. The liquid 25 is introduced into the annular region 24 through the passage 36 in the seal ring 30 and the recessed section 34 of the nozzle 34 using filling techniques well known in the art. The liquid 25 provides a mechanism for relieving the stress on the sleeve 20 when the dispensing device 100 is operated at a high pressure by equalizing the pressure on the inside of the sleeve 20 with the pressure on the outside of the sleeve 20. When the valve 10 is opened, the liquid 25 is withdrawn from the sleeve 20 by a volume regulating device. In a preferred embodiment, a constant volume piston 70 (FIGS. 1 and 2) is used to regulate the volume. In another embodiment which is described in detail hereinbelow, a pressure controlling device 80 (FIG. 3) is used to regulate the pressure.

The seal ring 30 isolates the valve chamber 12 from the actuator 50 and prevents the adhesive in the chamber 12 from leaking out. At the point where the valve stem 40 passes through the seal ring 30, the valve stem 40 is surrounded by the liquid 25. To dispense the adhesive inside the valve chamber 12, the actuator 50 retracts the valve stem 40, which in turn withdraws the needle valve 42 from the Valve seat 60 and opens the outlet port 16. The second end 20b of the sleeve 20 attached to the tapered nozzle 32 of the seal ring 30 remains stationary and the first end 20a of the sleeve 20 moves with the valve stem 40. The bellows 22 allows the sleeve 20 to remain substantially stationary by collapsing and expanding as the valve stem 40 reciprocates. The bellows 22 collapses when the stem 40 is retracted and the volume inside the sleeve 20 decreases and expands when the valve stem 40 is extended.

As shown in further detail in FIG. 5, the seal ring 30 is preferably circular in shape and has an opening 37 in the center through which the valve stem 40 passes. The outer circumference of the seal ring 30 has an outside edge 39 and the inner circumference of the seal ring 30 together with the interior surface of the tapered nozzle 32 forms an interior wall 38. The seal ring 30 is provided with at least one passage 36 connecting the outside edge 39 of the seal ring 30 with the interior wall 38. In addition, the interior wall 38 has at least one recessed section 34 (FIG. 5) that provide a means for communication between the liquid 25 in the sleeve and the exterior of the seal ring 30. The liquid 25 is introduced to the region 24 between the sleeve 20 and the valve stem 40 through the recessed area 34 and the passage 36.

In the preferred embodiment of the present invention shown in FIGS. 1 and 2, the recessed section 34 allows the liquid 25 to flow from the sleeve 20 through the seal ring 30 to a constant volume piston 70. The liquid 25 in the sleeve 20 passes through the seal ring 30 to the constant volume piston 70 which balances the volume of the liquid 25 as the sleeve internal volume changes. When the valve stem 40 is retracted to open the valve 10, the constant volume piston 70 accepts the liquid 25 that is displaced from the sleeve 20. When the valve stem 40 is extended to close the valve 10, the pressure in the chamber 12 and on the outside of the sleeve 20 increases. In response to the increased pressure, the constant volume piston 70 forces the liquid 25 through the recessed section 34 to increase the pressure inside the sleeve 20 and to prevent the sleeve 20 from rupturing or leaking liquid 25 into the valve chamber 12. The constant volume piston 70 is preferably mounted on the valve stem 40 and the movement of the valve stem 40 controls the position of the piston 70. As the valve stem 40 is withdrawn to open the outlet port 16, the pressure inside the valve chamber 12 decreases and the constant volume piston 70 opens to accept the liquid 25, which lowers the pressure inside the sleeve 20. The constant volume piston 70 controls the pressure of the liquid 25 as the volume of the sleeve 20 changes.

The seal ring 30 has a continuous recessed section 34 from the end 32a of the tapered nozzle 32 to the opposing face of the seal ring 30a. This provides a means for the liquid 25 to pass from the sleeve 20 to the constant volume piston 70 located on the opposing side of the seal ring 30. When the valve 10 is opened, the valve stem 40 is retracted and the volume in the sleeve 20 decreases. The liquid 25 flows from the sleeve 20 through the recessed section 34 to the constant volume piston 70, which expands to receive the liquid 25 that flows out of the sleeve 20. When the valve 10 is closed, the valve stem 40 is extended and the constant volume piston 70 contracts forcing the liquid 25 in the constant volume piston 70 back into the sleeve 20 and preventing the sleeve 20 from collapsing as the pressure on the outside of the sleeve 20 increases.

In another embodiment of the present invention, a pressure controlling device 80 is used to control the pressure of the liquid 25 instead of a constant volume piston 70. As shown in FIG. 3, the liquid 25 flows from the sleeve 20, through the recessed section 34 and the passage 36, to the pressure controlling device 80. The embodiment shown in FIG. 3 is substantially similar to the embodiment shown in FIGS. 1 and 2 except for the substitution of the pressure controlling device 80 for the constant volume piston 70 and a different end cap 62', valve seat 60', outlet port 16' and needle valve 42' configuration.

Pressure controlling device 80 is connected to the seal ring 30 and includes a spring opposed diaphragm 84 and a spring adjusting mechanism 82. The liquid 25 is introduced through a fill port 86 on the opposing side of the seal ring 30 using conventional techniques to assure that all of the air in the sleeve 20, passage 36, recessed section 34 of the nozzle 32 and the pressure controlling device 80 is removed.

The pressure controlling device 80 absorbs the fluctuations in the pressure of the liquid 25 resulting from the opening and closing of the dispensing device 100'. The pressure controlling device 80 is preferably an adjustable spring opposed pressure regulator. When the valve stem 40 is retracted to open the dispensing device 100', the volume in the sleeve 20 decreases as the bellows 22 contracts and the pressure inside the sleeve 20 increases. At the same time, the pressure on the outside of the sleeve 20 decreases because the valve outlet port 16 is open. The pressure regulator adjusts the pressure of the liquid 25 in response to these changes to prevent the pressure from exceeding a preset limit. When the valve 10 closes, the valve stem 40 is extended to insert the needle valve 42 in the outlet port 16 and the bellows 22 expands. At the same time, the pressure on the outside of the sleeve 20 increases as the outlet port 16 is closed. The pressure controlling device 80 balances the pressure of the liquid 25 inside the sleeve 20 with the pressure of the adhesive on the outside of the sleeve 20 by monitoring the pressure of the adhesive in the valve chamber 12 and adjusting the pressure of the liquid 25 accordingly. As the pressure of the adhesive changes, the pressure controlling device 80 changes the pressure of the liquid 25 so that they remain substantially equal.

The dispensing device 100 is constructed from materials well known to those skilled in the art. The valve body 10 and the valve cap 62 can be fabricated from aluminum, steel, plastic or a combination of one or more of these materials. It is preferred that the valve body 10 and the valve cap 62 be constructed of plastic with a PTFE coating on the interior surfaces. Valve body and the valve cap 62 may also be fabricated from anodized aluminum with the interior surfaces are coated with PTFE. The valve seat 60 and the needle valve 42 are constructed of a PTFE coated plastic or metal and for high pressure applications the preferred material of construction is stainless steel. Stainless steel is preferred for high pressure applications because the pressure drop across the valve outlet port 16 can quickly erode softer materials. Stainless steel is also used when the material being dispensed has chemical characteristics that are incompatible with aluminum or plastics. The valve stem 40 can be made from aluminum or steel coated with PTFE or combinations of both. Preferably, the needle valve 42 is made of stainless steel and it is connected to an aluminum valve stem 40 coated with PTFE. The sleeve 20 and the valve stem 40 can be made from PTFE, nylon, polyethylene, polypropylene or a combination of one or more of these materials. However, PTFE is preferred because it is flexible at high temperatures and pressures while providing excellent resistance to chemical attack from the adhesives.

EXAMPLE

A PTFE sleeve was formed having a bellows section in the middle and a length of approximately 2 inches and a ⅜ inch inside diameter. The sleeve was fitted onto the valve stem of an adhesive dispensing device and the valve was assembled according to the embodiment of the present invention shown in FIG. 1. The valve stem assembly, including the sleeve, the seal ring and the constant volume piston were assembled while submerged in oil. This insured that the sleeve and piston were completely filled with oil and there were no air pockets. The valve stem assembly was wiped clean of oil and connected to the valve body. A piston actuator was then connected to the valve stem to open and close the valve. A test stand was set up and an adhesive supply line was connected to the inlet port of the valve and adhesive was supplied to the valve at 1,000 psi. A series of tests were then conducted using PTFE sleeves similar to the sleeve described above. The dispensing device was operated until a failure of the sleeve was detected and the number of cycles (the opening and closing of the valve is counted as a cycle) recorded. The results of these tests are shown below in Table I.

TABLE I

| TEST NO. | TYPE OF SLEEVE | NUMBER OF CYCLES |
|---|---|---|
| 1 | PTFE | more than 200,000 |
| 2 | PTFE | more than 232,000 |
| 3 | PTFE | more than 227,000 |

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

What is claimed:

1. A dispensing device comprising:
   a housing defining a chamber having an inlet port and an outlet port in communication with said chamber for receiving and dispensing a flowable material;
   a valve assembly within said housing, said valve assembly having a moveable valve stem for opening and closing said outlet port;
   a flexible sleeve disposed in surrounding relationship about a section of said valve stem for isolating said flowable material from said section of said valve stem, said flexible sleeve comprising a flexible section and further defining a space between said sleeve and said valve stem for accommodating a flowable material therewithin; and
   means for introducing said flowable material into said space.

2. A dispensing device according to claim 1, further comprising means for controlling the pressure of said liquid.

3. A dispensing device according to claim 1, wherein said flexible sleeve comprises a bellows.

4. A dispensing device according to claim 1, wherein said sleeve comprises a material selected from the group consisting of polytetrafluoroethylene, nylon, polyethylene, polypropylene and combinations thereof.

5. A dispensing device comprising:
   a housing defining a chamber having an inlet port and an outlet port in communication with said chamber for receiving and dispensing a flowable material;
   valve means within said housing, said valve means having a moveable valve stem for opening and closing said outlet port;
   actuating means for moving said valve stem;
   a flexible sleeve disposed in surrounding relationship about said valve stem and defines a space about said valve stem for isolating said flowable material from said valve stem, said space containing an incompressible fluid; and
   means for introducing said incompressible fluid into said space.

6. A dispensing device according to claim 5, wherein said flexible sleeve comprises a compressible section.

7. A dispensing device according to claim 5, wherein said flexible sleeve comprises a bellows.

8. A dispensing device according to claim 5, further comprising a seal having a tapered nozzle, wherein said sleeve is disposed around said nozzle and said seal is disposed between said flowable material and said actuating means.

9. A dispensing device according to claim 8, wherein said seal further comprises means for introducing said incompressible fluid between said sleeve and said stem.

10. A dispensing device according to claim 5, further comprising sealing means disposed between said chamber and said actuating means.

11. An adhesive dispensing device according to claim 10, wherein said flexible sleeve comprises a compressible section.

12. An adhesive dispensing device according to claim 10, wherein said flexible sleeve comprises a bellows.

13. An adhesive dispensing device according to claim 10, wherein said sealing means comprises a seal having a tapered nozzle, and wherein said sleeve is disposed around said nozzle.

* * * * *